(12) United States Patent
Kluwe

(10) Patent No.: US 8,037,991 B2
(45) Date of Patent: Oct. 18, 2011

(54) METHOD FOR REGULATING A CONVEYING STREAM COMPOSED OF ARTICLES OF THE TOBACCO-PROCESSING INDUSTRY BETWEEN A TRAY DISCHARGER AND A FEED DEVICE WITH MULTIPLE FEED UNITS

(75) Inventor: Sven Kluwe, Hamburg (DE)

(73) Assignee: Hauni Maschinenbau AG, Hamburg (DE)

( * ) Notice: Subject to any disclaimer, the term of this patent is extended or adjusted under 35 U.S.C. 154(b) by 498 days.

(21) Appl. No.: 12/146,519

(22) Filed: Jun. 26, 2008

(65) Prior Publication Data

US 2009/0003980 A1 Jan. 1, 2009

(30) Foreign Application Priority Data

Jun. 26, 2007 (DE) .......................... 10 2007 030 049

(51) Int. Cl.
*B65G 19/00* (2006.01)
*B65G 19/04* (2006.01)

(52) U.S. Cl. ................ 198/341.09; 198/347.1; 198/572; 53/151; 53/501; 53/444; 414/222.08; 414/806

(58) Field of Classification Search .............. 198/418.1, 198/418.4, 396, 836.2; 53/444, 151
See application file for complete search history.

(56) References Cited

U.S. PATENT DOCUMENTS

| | | | | |
|---|---|---|---|---|
| 3,777,874 A | * | 12/1973 | Birckhead | 406/32 |
| 4,555,011 A | | 11/1985 | Brown | |
| 4,865,179 A | * | 9/1989 | Carter et al. | 198/347.2 |
| 4,962,840 A | * | 10/1990 | Miura et al. | 198/347.1 |
| 5,145,054 A | * | 9/1992 | Nelson | 198/751 |
| 2005/0204706 A1 | * | 9/2005 | Spirito et al. | 53/444 |

FOREIGN PATENT DOCUMENTS

| | | |
|---|---|---|
| DE | 33 33 859 A1 | 4/1984 |
| DE | 3333859 A1 | 4/1984 |

(Continued)

OTHER PUBLICATIONS

German Office Action issued in 10 2007 030 049.4 dated Mar. 12, 2008.

*Primary Examiner* — Kavel Singh
(74) *Attorney, Agent, or Firm* — Venable LLP; Robert Kinberg; Kyle D. Petaja

(57) ABSTRACT

A method is provided to regulate a conveying stream composed of articles of the tobacco-processing industry between at least one tray discharger and connected to at least one feed device by a conveying element that conveys a mass flow of the articles. The feed device has at least one chamber designed to receive the articles, and each chamber has at least two feed units running independently of each other to feed the articles to subsequent apparatuses. Each feed unit has an individual feed rate ($P_1, P_2, \ldots P_n$). The method includes monitoring a level within the feed device using monitoring elements; sending a signal to each of the at least one tray dischargers for regulating the speed of transport of the conveying element and the feed rate (in articles/min) as a function of a current level within the feed device, and adapting the speed of transport to a desired level. The speed of transport of each conveying element is additionally regulated as a function of the feed rate ($P_{total}$) formed from the sum of the individual feed rates ($P_1, P_2, \ldots P_n$) of all feed units assigned to a respective chamber.

13 Claims, 2 Drawing Sheets

FOREIGN PATENT DOCUMENTS

| | | |
|---|---|---|
| DE | 36 11 707 A1 | 10/1987 |
| DE | 3611707 A1 | 10/1987 |
| DE | 41 18 267 A1 | 12/1992 |
| DE | 3538660 C2 | 5/1996 |
| EP | 0 136 827 A2 | 4/1985 |
| GB | 1602841 | 11/1981 |
| GB | 2 157 252 A | 10/1985 |
| WO | WO 2004/082410 A1 | 9/2004 |

* cited by examiner ered and the reaction time of the conveying element. Thus the current demand for articles at any given time can be determined more or less online and adjusted accordingly.
METHOD FOR REGULATING A CONVEYING STREAM COMPOSED OF ARTICLES OF THE TOBACCO-PROCESSING INDUSTRY BETWEEN A TRAY DISCHARGER AND A FEED DEVICE WITH MULTIPLE FEED UNITS

CROSS-REFERENCE TO RELATED APPLICATIONS

This application claims priority from German Application No. 102007030049.4, filed on Jun. 26, 2007, the disclosure of which is incorporated herein by reference in its entirety.

BACKGROUND OF THE INVENTION

The invention concerns a method for regulating a conveying stream composed of articles of the tobacco-processing industry between at least one tray discharger and at least one feed device connected to the or each tray discharger by a conveying element for conveying a mass flow consisting of articles, wherein the feed device has at least one chamber designed to receive the articles, and each chamber has at least two feed units running independently of each other for feeding the articles to subsequent apparatuses, wherein each feed unit has an individual feed rate ($P_1, P_2, \ldots P_n$), with the steps of: monitoring the level within the feed device using monitoring elements, sending a signal to each tray discharger for regulating the speed of transport of the conveying element and hence the feed rate (in articles/min) dependent on the current level within the feed device, and adapting the speed of transport to the desired level. Furthermore the invention concerns an arrangement for transferring rod-shaped articles of the tobacco-processing industry to subsequent apparatuses, comprising at least one tray discharger, at least one feed device, wherein the feed device has at least one chamber designed to receive the articles and each chamber being assigned at least two feed units, each tray discharger and the feed device being connected to each other by a conveying element and each comprising a control system for regulating the conveying element.

Such methods and apparatuses are used in particular in the tobacco-processing industry. Here, preferably rod-shaped articles such as e.g. filter rods or the like are processed. In particular, these articles are frequently stocked or temporarily stored in containers, the so-called trays, or otherwise. The articles delivered to the feed device are then sent from the latter preferably pneumatically to subsequent apparatuses. For this purpose the feed device has at least two, but preferably more feed units, by means of which the articles are sent dependent on the individual feed rate. In order now to supply this feed device with articles, the articles are transferred from the trays or the like to the tray discharger, and from the tray discharger via the conveying element the mass flow composed of the articles is transported to the feed device. The mass flow flows in the region of an inlet into the magazine of the feed device. The monitoring elements, which are preferably arranged within the magazine, detect the current level within the magazine. With the aid of the information picked up by the monitoring elements, the speed of transport of the conveying element and hence the feed rate of articles are regulated.

In practice, this means that the signal exchange is usually effected via two signals by means of which only three different states for the conveying element can be shown, namely e.g. a) transport no articles, b) transport 100% articles and c) transport more than 100% articles. This method, however, has the drawback that only uneven supply of the magazine of the feed device with a varying level within the magazine can be achieved. In other words, the magazine of the feed device is supplied with articles cyclically only, wherein filling of the magazine depends exclusively on the level of the magazine. Switching the conveying element on and off alternately, accompanied by interruption of the stream of articles into the receiving device, leads to so-called stop-and-go operation. Document DE 33 33 859 A1 from the applicant's firm shows a storage arrangement and a corresponding method having the features of the preambles of independent claims 1 and 19. The arrangement shown there has a receiving chamber within the feed device, the level of which is monitored by sensing means. Depending on the information of the sensing means, the input conveyor for the delivery of articles is switched on or off. A comparable arrangement can be found in DE 36 11 707 A1, which also comes from the applicant's firm, wherein the storage container of the feed device has two chambers. An input conveying means leads into each chamber. The articles conducted into the chamber by the respective input conveying means are carried away via outlet shafts assigned to each chamber. From DE 35 38 660 C2 is known a signal transmission system in which delivery of the articles to a receiving device is regulated dependent on the level of the latter device. The feed amount is regulated by interrupting the conveying stream for an interval of time, in order then to be switched on again for an interval of time.

SUMMARY OF THE INVENTION

It is therefore the object of the present invention to propose a method which ensures uniform supply of the magazine with a substantially constant level. Furthermore it is the object of the invention to propose an arrangement for carrying out the method.

This object is firstly achieved by a method with the steps mentioned hereinbefore by the fact that the speed of transport of each conveying element assigned to a tray discharger, in addition to dependence on the current level within a chamber, is also regulated dependent on the feed rate ($P_{total}$) formed from the sum of the individual feed rates ($P_1, P_2, \ldots P_n$) of all feed units assigned to a chamber. Thus in a surprisingly simple and exact manner the current and individual feed rates of the feed units are known, so that in combination with the level within the magazine of the feed device a constant level is obtained. As the current quantity removed by the feed units at any time is taken into consideration when regulating the conveying stream, the conveying element can be regulated in such a way that the level of the articles in the magazine or in the individual chambers remains constant at any given time.

An appropriate development of the invention provides that the speed of transport of the conveying element is regulated continuously. "Continuously" means that the cycles of scanning the respective demand are shorter than the reaction time of the conveying element. In other words, scanning of the respective demand is carried out cyclically, but the conveying element continuously transports the articles from the tray discharger to the feed device. Thus the current demand for articles at any given time can be determined more or less online and adjusted accordingly.

Advantageously, signal transmission takes place by pulse-width modulation which is particularly insensitive to interference and also allows stable transmission over longer distances.

A preferred method is characterised by the fact that the pulse width is a function of the feed rate. In other words, the length of the signals gives information about an actual value of the articles to be conveyed. Specifically, this can mean for example that a signal of length 100-299 ms corresponds to a quantity of 5000 articles/min. In other words, the signals not only contain the information that articles are needed, but concurrently deliver the information as to what specific quantity is needed. As a result it is possible to keep the level within the magazine almost constant.

Preferably, the pulse width behaves in inverse proportion to the feed rate. A short signal corresponds to a large quantity (many articles/min) and a long signal corresponds to a small quantity (few articles/min). This ensures that, in case of a high demand for articles, very quick information (short signal) is delivered, whereas, if the demand is lower, slower information (long signal) is sufficient.

Secondly, the object is also achieved by an arrangement having the features mentioned hereinbefore by the fact that the control system of the feed device includes an adder for forming a feed rate $P_{total}$ from the individual feed rates of all feed units assigned to a chamber. The resulting advantages have already been named in connection with the method described above, so that reference is made to the corresponding passages to avoid repetition.

BRIEF DESCRIPTION OF THE DRAWINGS

Further preferred or appropriate developments and features of the invention are apparent from the subsidiary claims and the description. The method and the arrangement are described in more detail with the aid of the attached drawings. The drawings show:

DETAILED DESCRIPTION

The method described below with the corresponding arrangement serves to regulate a conveying stream composed of filter rods from a tray discharger to a feed device. Naturally, conveying streams of other articles and between other apparatuses, devices, machines, etc. can be regulated using the method as well.

Figure 1:
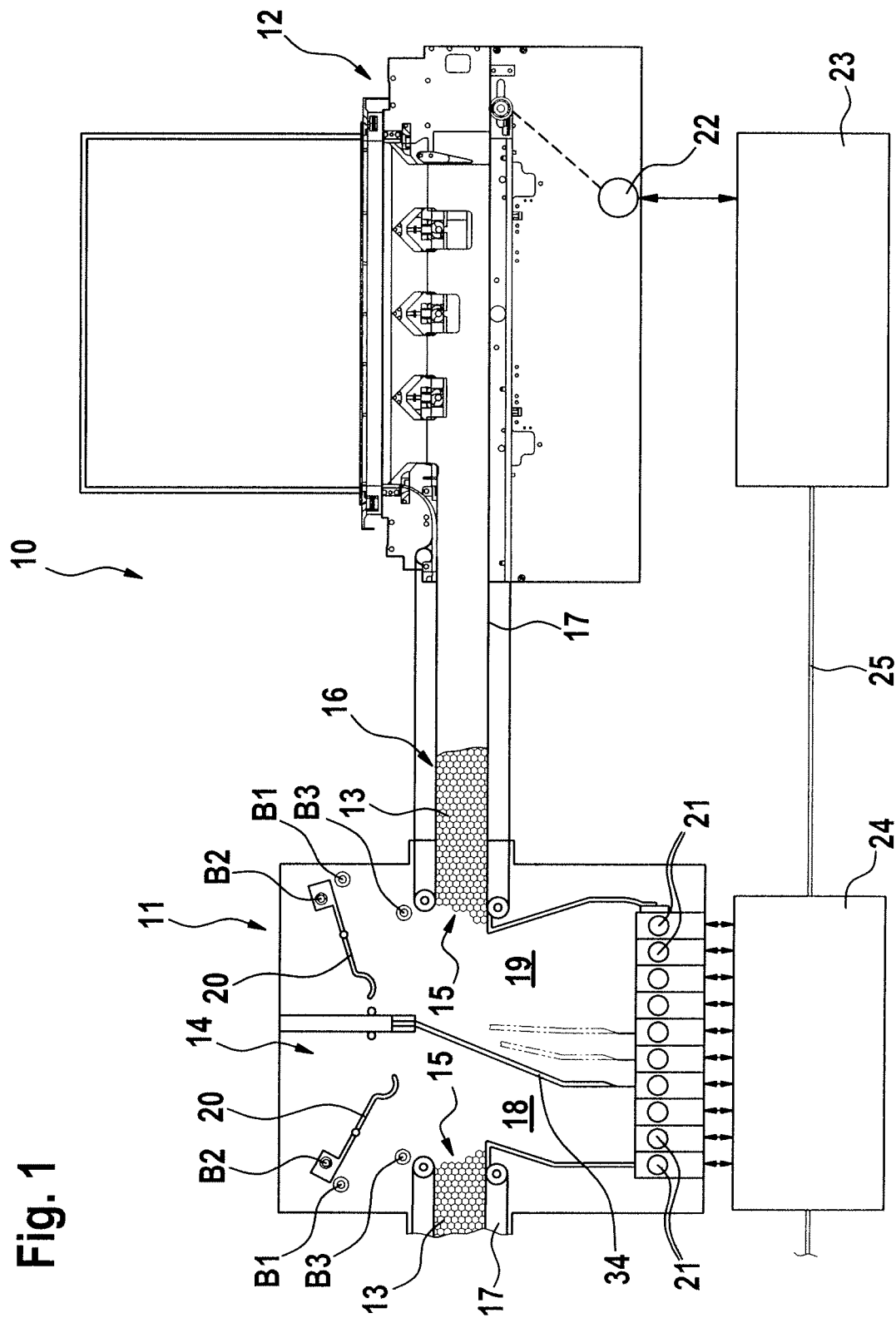
FIG. 1 a schematic view of the arrangement with a tray discharger and a feed device connected to the tray discharger by a conveying element, and FIG. 2 a schematic circuit diagram of the control systems of the tray discharger on the one hand and the feed device on the other hand, which are linked to each other.

In FIG. 1 is shown schematically a part of a first arrangement 10. The arrangement 10 comprises in full a feed device 11 which is supplied with articles 13 by two tray dischargers 12. For this arrangement 10, the principle of the method described below is particularly effective and efficient. For the sake of simplicity, only one of the tray dischargers 12 is shown. The feed device 11 has a magazine 14 which is divided e.g. by a partition 34 or the like and which on both sides has an inlet 15 for the mass flow composed of the articles 13. Naturally, the arrangement 10 can also consist of only one feed device 11 and one tray discharger 12. Other embodiments have a single tray discharger 12 which supplies two or more feed devices 11. Also the feed device 11 can have an undivided magazine 14. The or each feed device 11 is connected to the or each tray discharger 12 by a conveying element 17. The conveying element 17, which is preferably designed as a belt conveyor, serves to convey/transport the mass flow 16 into the magazine 14 of the or each feed device 11.

Within the magazine 14 are arranged several monitoring elements. In each chamber 18, 19 of the magazine 14 are preferably arranged three monitoring elements B1, B2 and B3. The number of monitoring elements B1, B2, B3 can of course vary as well as their position. Preferably, two monitoring elements B1 and B2 are constructed and designed to monitor the level of the articles 13 within the magazine 14 or in each chamber 18, 19 of the magazine 14. In other words, the elements B1 and B2 monitor the level within the magazine 14. The monitoring elements B1, B2 can e.g. be designed as proximity switches which are activated via a lever 20 which senses the level. Naturally, the monitoring elements B1 and B2 can also be designed as optical elements or in some other usual way. The same applies to the monitoring element B3 which monitors the level in the region of the inlet 15.

The feed device 11 has several feed units 21 which are usually arranged below the magazine 14. The number of feed units 21 is at least two, preferably ten. But the number of feed units 21 can also be any other quantity. In particular, with a so-called divided magazine 14 there is provision for variable assignment of the feed units 21 to the chambers 18, 19. In the case of an undivided magazine 14, all the feed units 21 are assigned to the single chamber. In the example shown, each chamber 18, 19 is assigned feed units 21. Purely as an example, chamber 18 is assigned three feed units 21 and chamber 19 seven feed units 21. By means of the feed units 21, the articles are taken out of the magazine 14 and preferably sent pneumatically to a subsequent receiving station. The feed units 21 also each work independently of each other within a chamber 18, 19. This also means that each feed unit 21 can have an individual feed rate which is usually between 0 and 1500 articles/min. However, other feed rates are possible as well. The respective feed rate is optionally predetermined by an operator or via a signal wire by the corresponding receiving station. A preferred method for predetermining the feed rate is described in DE 35 38 660 C2 mentioned hereinbefore.

The tray discharger 12 is constructed in the usual manner, so that a detailed description is dispensed with. The conveying element 17 assigned to each tray discharger 12 is driven in rotation by a motor 22. The tray discharger 12 is assigned a control system 23 by means of which in particular the motor 22 can be regulated. To put it another way, the control system 23 preferably serves to regulate the speed of transport of the conveying element 17. The feed device 11 is also assigned a control system 24 which is functionally connected to or communicates with the control system 23 by wires 25 or by radio. Apart from the monitoring elements B1, B2, B3, the feed units 21 are also connected to the control system 24 of the feed device 11.

For the sake of simplicity, the control part of the control system 24 for signal processing of chamber 19 is shown below. The control part for chamber 18 is, if it exists, constructed accordingly. The control system 24 of the feed device 11 includes an adder 26 which adds up the individual feed rates $P_1$ to $P_n$ of the feed modules 21 of chamber 19 to form the total feed rate $P_{total}$, that is, the current quantity to be picked up by the feed device 11. Specifically, in the example shown the feed rates $P_4$ to $P_{10}$ are added up. Furthermore the control system 24 has several, preferably two change-over switches 27, 28 by means of which it is possible to switch back and forth between different signal wires, depending on the monitoring elements B1, B2, B3. A further adder 29 for forming a difference (by adding or subtracting, depending on the preceding sign) as well as a converter 30 for converting a quantity (e.g. articles/min=A/min) to a signal also form part of the control system 24. The control system 23 of the tray discharger 12 includes a converter 31 for converting a signal to a quantity (e.g. articles/min), an adder 32 for forming a difference (by adding or subtracting, depending on the preceding sign) as well as a further converter 33 for converting a quantity (e.g. articles/min) to another quantity (e.g. revolutions per minute=rpm).

Figure 2:
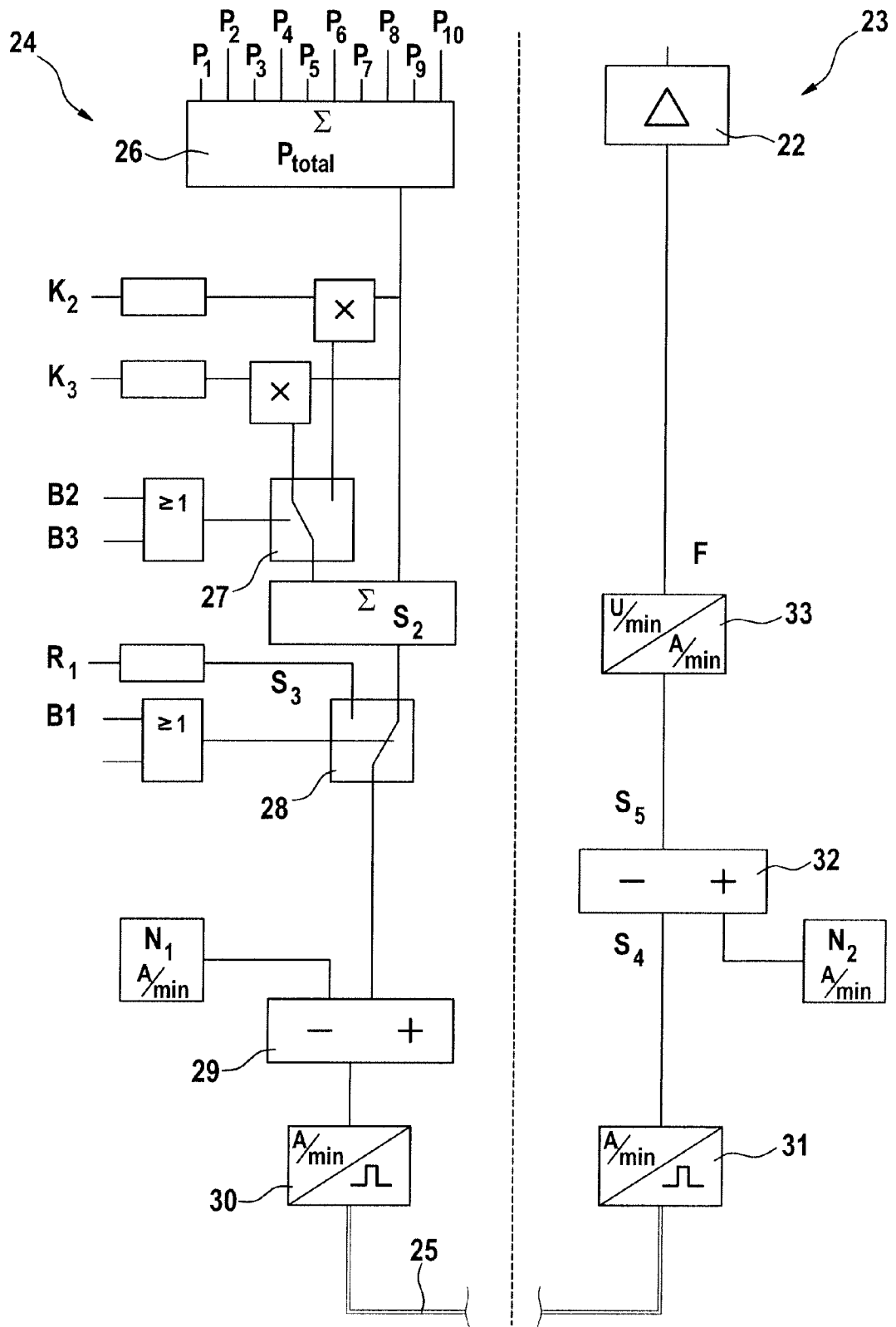

Below, the method is described in more detail with the aid of FIG. 2. During production of the apparatuses subsequent to the arrangement 10, feed drums of the feed units 21 take from the magazine 14 a quantity of articles 13 which changes constantly and differs from one feed unit 21 to the next. The adder 26 adds up the individual feed rates $P_1$ to $P_n$, in the present case $P_1$ to $P_3$ for chamber 18 and $P_4$ to $P_{10}$ for chamber 19, to a total feed rate $P_{total}$ (e.g. in articles/min) for each chamber 18, 19. In the event that the feed device 11 has only one chamber, the feed rates of all feed units 21 are added up. In the present case with a feed device 11 comprising two chambers 18, 19, chamber-related total feed rates are produced for each chamber 18, 19 independently of each other. This quantity/sum which is determined for each chamber 18, 19 is corrected according to the state of the monitoring elements B2 and B3 dependent on the level. The correction is preferably made by the fact that the total feed rate $P_{total}$ is multiplied by a correction factor $K_2$ or $K_3$ in dependence of the monitoring elements B2 and B3 which permanently monitor the level within the magazine 14. Here, monitoring element B2 monitors a defined level which is below the maximum level which is monitored by monitoring element B1. Monitoring element B3 monitors the level in the region of the inlet 15. Alternatively, a sum can be added to or subtracted from the quantity/sum determined by the adder 26. The sum resulting from multiplication or addition/subtraction is the sum $S_2$.

Specifically, this means that the feed rate $P_{total}$ is increased by a defined value. To put it another way, the sum $S_2$ is basically greater than the feed rate $P_{total}$. But if one of the two monitoring elements B2 or B3 indicates that the level monitored is reached, the change-over switch 27 is thrown so that subsequently the feed rate $P_{total}$ is reduced by a defined correction value, so that then the sum $S_2$ is lower than the feed rate $P_{total}$. The sum $S_2$ is then passed to the adder 29. In the event that the monitoring element B1 indicates that the maximum level within the magazine 14 is reached, the switch 28 is thrown so that the sum $S_2$ is optionally replaced by a sum $S_3$ which is much lower than the sum $S_2$, or multiplied by a reduction factor $R_1$, multiplication also yielding the sum $S_3$.

Depending on the position of the switch 28, the sum $S_2$ or $S_3$ is processed by the adder 29, including the feed rate $N_1$ calculated immediately before. In other words, the adder 29 calculates by addition or subtraction the difference between the last calculated feed rate $N_1$ (in articles/min) and the current new feed rate which is expressed by the sum $S_2$ or $S_3$ (also in articles/min). The resulting difference value (A/min) is converted by the converter 30 to a signal on a first signal wire 25. On a further signal wire 25 is transmitted a signal which indicates whether the difference value or the corresponding signal has a positive or negative preceding sign, that is, whether the new feed rate is to be increased or decreased. The length of the signal formed from the difference value indicates how great the difference value is, that is, how great is to be the quantity to be conveyed. In other words, signal transmission takes place by pulse-width modulation, the pulse width being a function of the feed rate. As already mentioned above, the pulse width behaves in inverse proportion. This means that a short signal indicates a high feed rate, while a longer signal indicates a lower feed rate.

The signal wires 25 form the transition from the control system 24 of the feed device 11 to the control system 23 of the tray discharger 12. By the control system 23 the signals transmitted by the signal wires 25 are evaluated. This evaluation contains first of all conversion of the signals to a quantity (A/min) as a sum $S_4$. From this sum $S_4$ on the one hand and a feed rate $N_2$ which was calculated two or more calculation cycles before, that is, at least before the feed rate $N_1$, the adder 32 calculates by addition or subtraction a difference which is represented by the sum $S_5$. The sum $S_5$ then represents the currently needed feed rate. The sum $S_5$ in turn is converted by the converter 33 to a reference variable F (e.g. in revolutions per minute=rpm). This reference variable F then regulates the motor 22. By regulation of the motor 22, the speed of transport of the conveying element 17 is regulated. A high speed of transport means a high feed rate or conveying capacity. A low speed of transport means a low feed rate or conveying capacity. In other words, the conveying element 17 is regulated in its speed in such a way that it delivers only the quantity of articles 13 actually required, ensuring continuous delivery of the articles 13 to the feed device 11.

The invention claimed is:

1. A method for regulating a conveying stream composed of articles of the tobacco-processing industry between at least one tray discharger and at least one feed device connected to the at least one tray discharger by a conveying element for transporting a mass flow of the articles, wherein the at least one feed device has at least one chamber arranged to receive the articles and each chamber has at least two feed units running independently of each other for feeding the articles to subsequent apparatuses, each feed unit having an individual feed rate ($P_1, P_2, \ldots P_n$), the method comprising:

monitoring a level within the at least one feed device using monitoring elements;

sending a signal to each tray discharger to regulate a speed of transport of the conveying element as a function of a current level within the feed device; and further regulating the speed of transport of the conveying element to a desired speed as a function of a total feed rate $P_{total}$, wherein the total feed rate $P_{total}$ is the sum of the individual feed rates ($P_1, P_2, \ldots P_n$) of each of the at least two feed units assigned to the at least one chamber as calculated during a calculation cycle, wherein the monitoring step includes:

monitoring the level within the at least one feed device at two different positions with first and second monitoring elements, the first monitoring element monitoring a maximum level when the feed device is completely full and the second monitoring element monitoring a defined level which is below the maximum level;

monitoring the level in the region of an inlet of the articles into the feed device with a third monitoring element;

multiplying the total feed rate $P_{total}$ by a correction factor for forming a sum $S_2$; and correcting the currently determined total feed rate $P_{total}$ according to the level monitored by the second and third monitoring elements, respectively, wherein the correction factor comprises first and second predetermined correction factors, the method further including increasing the feed rate ($P_{total}$) by the first predetermined correction factor and decreasing the feed rate ($P_{total}$) by the second predetermined factor only on reaching a ($P_{total}$) level monitored by the second or third monitoring element, respectively.

2. The method according to claim 1, including continuously regulating the speed of transport of the conveying element.

3. The method according to claim 1, including multiplying the sum $S_2$ by a reduction factor to form a sum $S_3$ in the event that the first monitoring element indicates the maximum level.

4. The method according to claim 3, including passing on the sum $S_2$ without multiplication by the reduction factor in the event that the maximum level is not yet reached.

5. The method according to claim 4, including forming a difference value between the sum $S_2$ or $S_3$, and a feed rate $N_1$, wherein the feed rate $N_1$ is calculated one calculation cycle before the calculation of the total feed rate $P_{total}$.

6. The method according to claim 5, including generating a signal representing the difference value and transmitting the signal representing the difference value from the feed device to the tray discharger.

7. The method according to claim 6, including transmitting a preceding signal for the preceding sign, positive or negative, of the difference value in addition to the signal representing the difference value.

8. The method according to claim 6, wherein signal transmission takes place by pulse-width modulation.

9. The method according to claim 8, wherein the pulse width is a function of the total feed rate $P_{total}$.

10. The method according to claim 9, wherein the pulse width behaves in inverse proportion to the total feed rate $P_{total}$.

11. The method according to claim 7, including converting the signals representing the difference value and the preceding sign to an absolute feed rate sum $S_4$.

12. The method according to claim 11, including forming a sum $S_5$ from the sum $S_4$ and a feed rate $N_2$, wherein the feed rate $N_2$ is calculated two calculation cycles before the calculation of the total feed rate $P_{total}$.

13. The method according to claim 12, further comprising converting the sum $S_5$ to the desired speed of transport F for the conveying element.

* * * * *